May 24, 1966  G. C. MAYER ET AL  3,252,531
WEIGHING APPARATUS

Filed Dec. 2, 1963  8 Sheets-Sheet 1

INVENTOR
VAHN J. SOOJIAN
GERALD C. MAYER

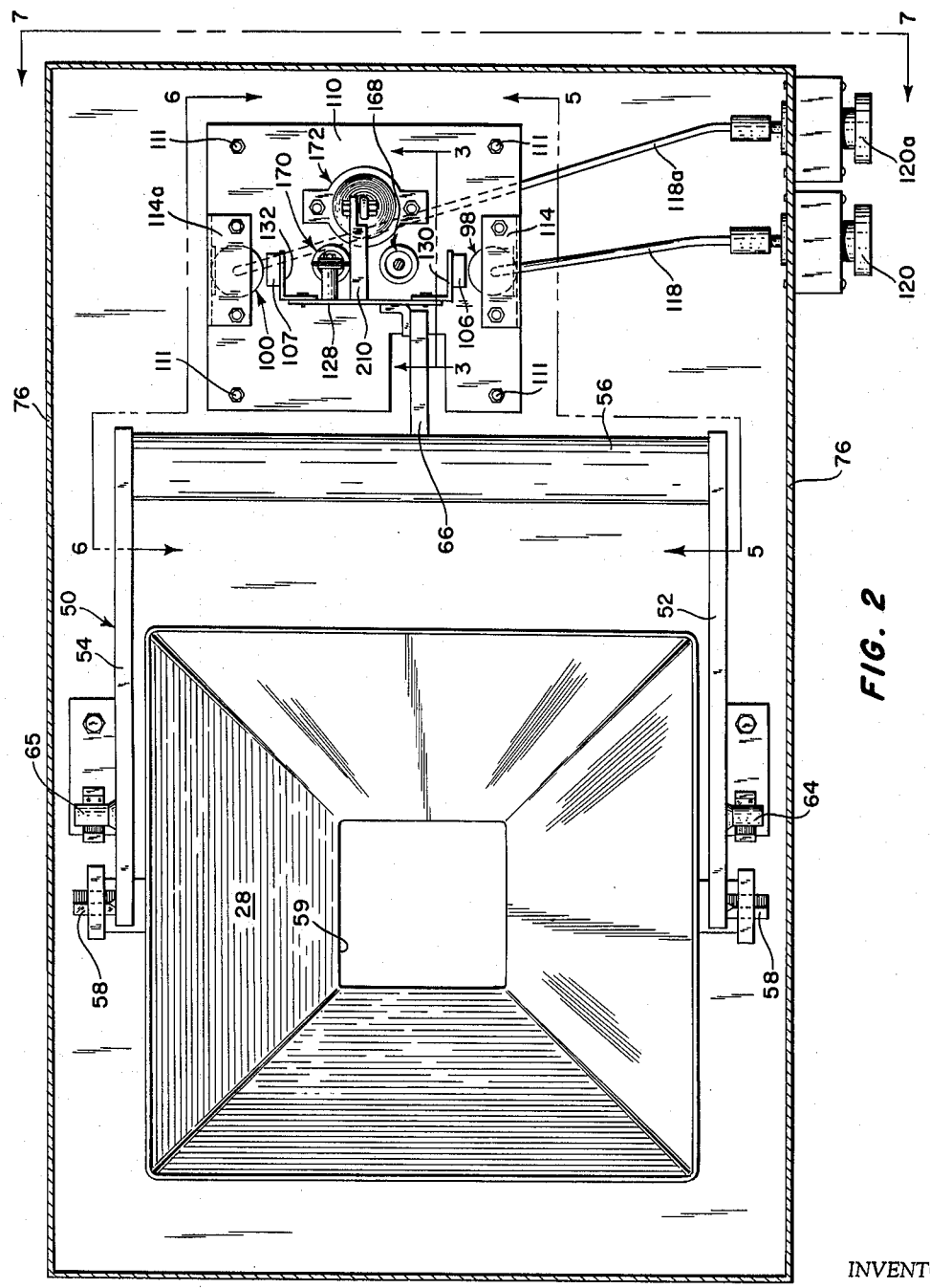

May 24, 1966  G. C. MAYER ET AL  3,252,531
WEIGHING APPARATUS
Filed Dec. 2, 1963
8 Sheets-Sheet 3
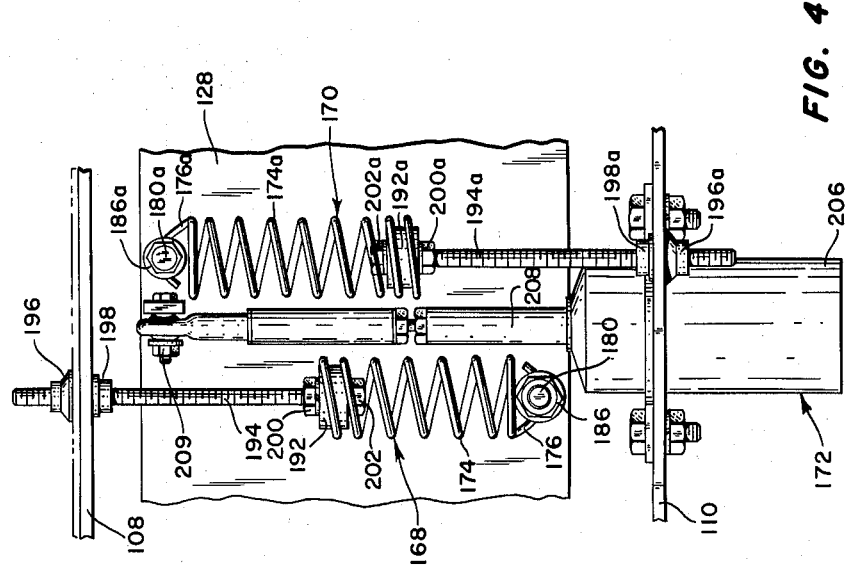
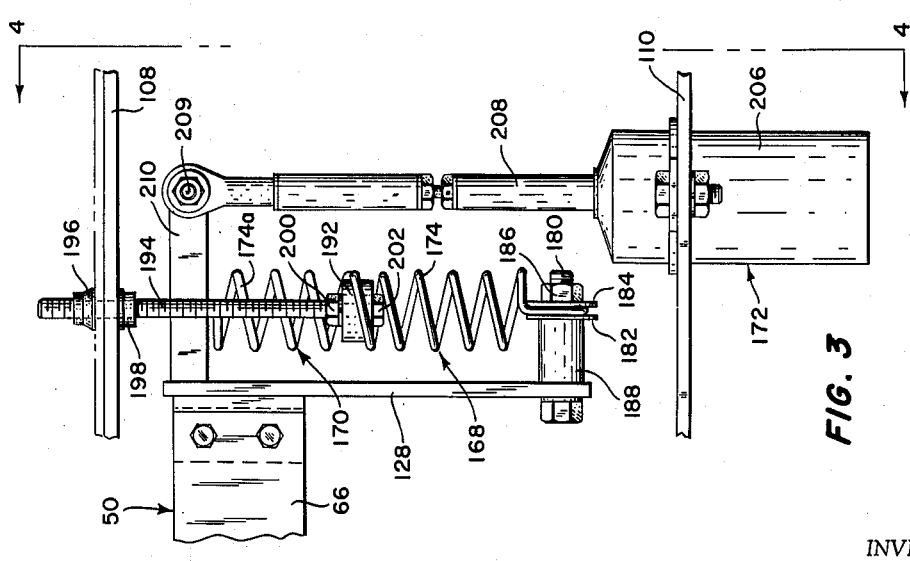
INVENTOR
VAHN J. SOOJIAN
GERALD C. MAYER

INVENTOR
VAHN J. SOOJIAN
GERALD C. MAYER

INVENTOR
VAHN J. SOOJIAN
GERALD C. MAYER

May 24, 1966 G. C. MAYER ET AL 3,252,531
WEIGHING APPARATUS
Filed Dec. 2, 1963 8 Sheets-Sheet 6
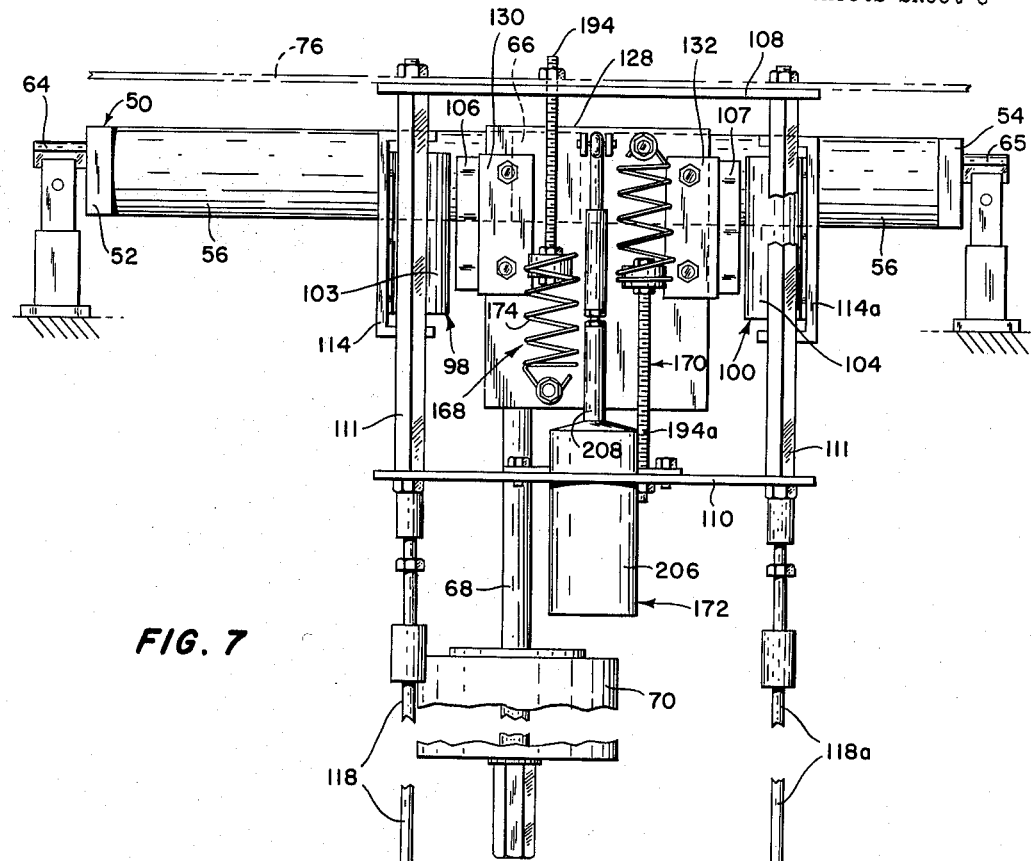
FIG. 7
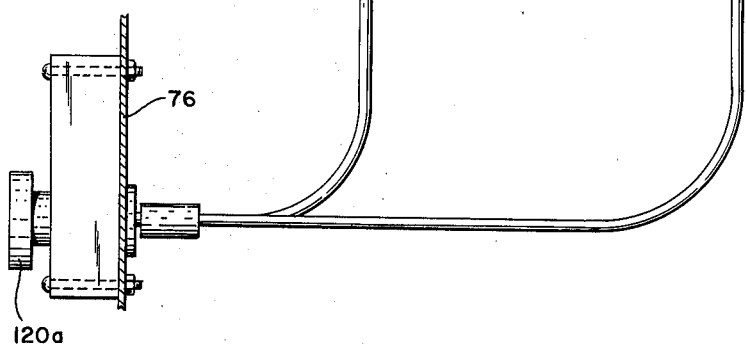
INVENTOR
VAHN J. SOOJIAN
GERALD C. MAYER

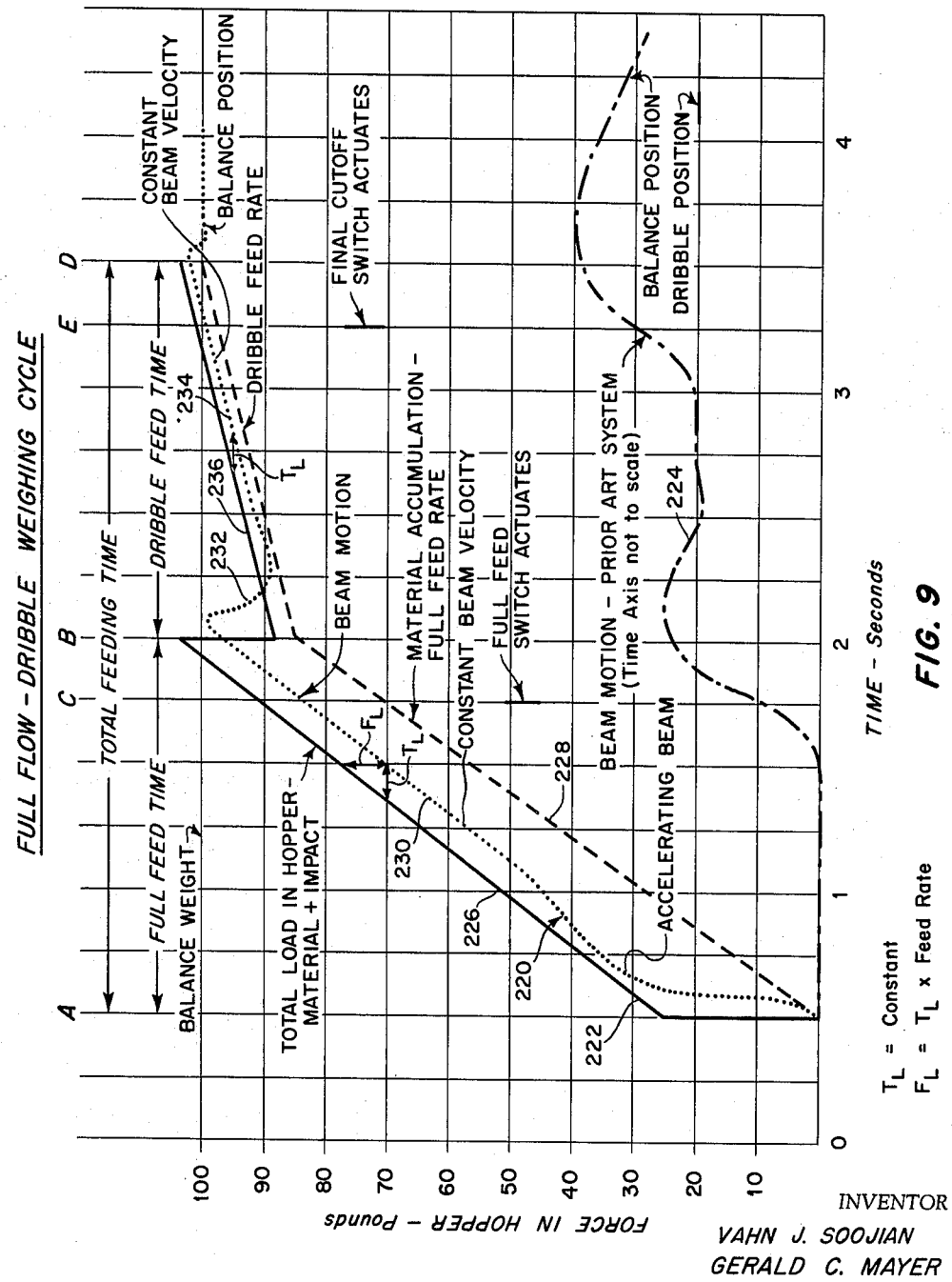

3,252,531
WEIGHING APPARATUS
Gerald C. Mayer, Wayne, and Vahn J. Soojian, Pompton Lakes, N.J., assignors to Howe Richardson Scale Company, Clifton, N.J., a corporation of Delaware
Filed Dec. 2, 1963, Ser. No. 327,280
10 Claims. (Cl. 177—69)

This invention relates to weighing apparatus and more particularly to automatic batch weighing apparatus wherein successive drafts of fluent or particulate material to be weighed are each fed in a continuous stream to beam supported scale hopper.

In certain aspects, this invention constitutes an improvement over the weighing machine disclosed in United States Letters Patent No. 2,497,015 granted to P. B. Richardson on February 7, 1950. Although prior art weighing machines of this type generally operate satisfactorily, they have objectionable limitations as to the speed and accuracy obtainable especially in repetitive batch weighing operations.

Typically, scales such as that disclosed in said Richardson patent comprise a free beam which supports a weigh hopper and a counter weight on opposite sides of the beam fulcrum. Material to be weighed is fed to the hopper in a continuous descending column, and when the load applied to the hopper approaches a weight that balances out the counter weight, the feed is automatically cut off by a catch gate or other suitable means. This type of weighing machine is basically a pre-weigher inasmuch as the weighment obtained is essentially predetermined by the counter weight on the beam. Accordingly, the accuracy of such pre-weighing machines is determined by the difference between the actual weight fed to the hopper and the desired predetermined weight.

Owing to the inertia of the weigh beam and the parts supported by the beam in the type of scales described above, there will be an appreciable lag between the time a load is applied to the weigh hopper and the time that the weigh beam responds to this load and eventually stabilizes. This increases the time needed for each feeding cycle and thus reduces the number of drafts that can be weighed and discharged in a given period without sacrifice of accuracy. In prior art weighing machines that terminate the feed cycle with a dribble feed, an additional and appreciable period is need to allow the weigh beam to stabilize at a dribble position before allowing the scale to proceed to final cutoff.

One of the major objects of this invention therefore is to provide a novel weighing apparatus for increasing the speed at which batch weighing operations can be made without sacrifice of accuracy.

As a result of the delayed response produced by the inertia of weigh beams in prior art pre-weighing machines of the foregoing type, the actual position of the beam lags an instantaneous static balancing position while material is being fed to the weigh hopper. This beam lag, unless compensated for, would impair the accuracy of the apparatus by permitting an amount of material in excess of the desired predetermined weight to enter the weigh hopper. Another factor requiring compensation is the time lag attributable to the unavoidable delay involved in transmitting a feed cutoff signal to effectuate completion of the feed cycle and to the inertia of parts associated with closing the cutoff gate in response to this signal.

To compensate for these delays and also to compensate for the material in suspension between the feeder and the weigh hopper at the time cutoff is made, it has been the custom prior to this invention to employ a second beam, often called a compensation beam. This compensation beam is operatively connected to the weigh beam and usually has a weight which is adjustable to vary the position of the weigh beam at which a cutoff signal is generated.

While compensating devices of this type are workable, there are several factors attributable to prior art pre-weighing machines which necessitate frequent, time-consuming compensative adjustment in order to maintain the accuracy of the apparatus within acceptable limits. The weigh beams of prior pre-weighing machines, for instance, are highly sensitive since they are confined to a short limited travel between upper and lower stops and only require a small weight addition in the weigh hopper to traverse the full distance between these stops. As a result, the beam lag varies considerably throughout the feeding cycle, and the weigh beam is usually in a transient accelerating condition at the time when control action takes place to cut off the feed of material to the weigh hopper. Consequently, the response time for closing the cutoff gate has more chance to vary.

Another important factor requiring frequent compensative adjustments in prior weighing machines of the type previously described is variations in the rate at which material is fed to the weigh hopper. These feed rate variations result from several factors such as, for example, changes in the operation of the feeding mechanism, or changes in bulk density or moisture content of the material being weighed.

When the feed rate changes in prior art weighing machines the beam lag also changes. As a result, the actual weight of material delivered to the weigh hopper will become lighter or heavier, thus requiring readjustment of the cutoff point if the weighing accuracy of the machine is to be maintained.

To effectively adjust the setting of compensating devices, it is necessary to check the new control setting by obtaining a series of successive test drafts and post weighing these drafts to determine their actual weights. The average of these actual weights is then compared with the desired predetermined weight to determine if the accuracy of the scale is within acceptable limits.

In checking the accuracy of the scale in this manner, at least two to five test drafts are needed since the actual weight of each batch of material usually will vary even though the feed rate is fairly constant. These weight variations are random in nature and are attributable to conglomerate errors and inconsistencies resulting from operation of all the various components of weighing machine. As a result, adjustments of this nature are objectionably time-consuming particularly where frequent changes in feed rate are experienced.

The present invention solves these problems essentially by rendering the beam lag constant and independent of feed rate of material to the weigh hopper. Thus, no compensating adjustments are needed whenever the feed rate changes, and repetitive batch weighing operations may be carried on with greater speed and accuracy than heretofore possible.

It has been discovered in this invention that a constant beam lag is obtained by a construction comprising a pair of springs adjusted in tension to exert opposite forces on the weigh beam which are equal in the static balanced position of the beam and cooperating with a dampening device to render the beam position closely proportional to the load applied to the weigh hopper.

Accordingly, it is a further object of this invention to improve the accuracy and speed of batch weighing operations by providing a novel weighing apparatus in which the time lag of the weigh beam from an instantaneous static balancing position is substantially constant and independent of feed rate.

Pursuant to these objects, it was found in practicing this invention that the catch gate for cutting off the feed of material to the weigh hopper can be critically located in such a position as to eliminate the need for compensating for material suspended between the hopper and the feeder. This is made possible since the time lag of the weigh beam and the catch gate reaction time are both constant and determinable. The gate in this invention thus is positionable below the point of zero vertical velocity in the falling column of material by a distance where it effectively prevents the material in transit for this time from reaching the weigh hopper. As a result, the beam position at static balance will be the same at which gate action was initiated.

Accordingly, it is a further object of this invention to provide a novel batch weighing apparatus having a beam-supported weigh hopper adapted to receive a freely falling column of material and a catch gate actuatable to cut off the feed to the hopper and positioned to effectively eliminate the need to compensate for material in suspension between the hopper and the material feeding mechanism at cutoff.

Further objects of the invention will appear from the appended claims and as the description proceeds in connection with the annexed drawings wherein:

FIGURE 2 is a section taken substantially alone lines 2—2 of FIGURE 1;

FIGURE 3 is a section taken substantially along lines 3—3 of FIGURE 2;

FIGURE 4 is a section taken substantially along lines 4—4 of FIGURE 3;

FIGURE 7 is a section taken substantially along lines 7—7 of FIGURE 2;

Figure 1:
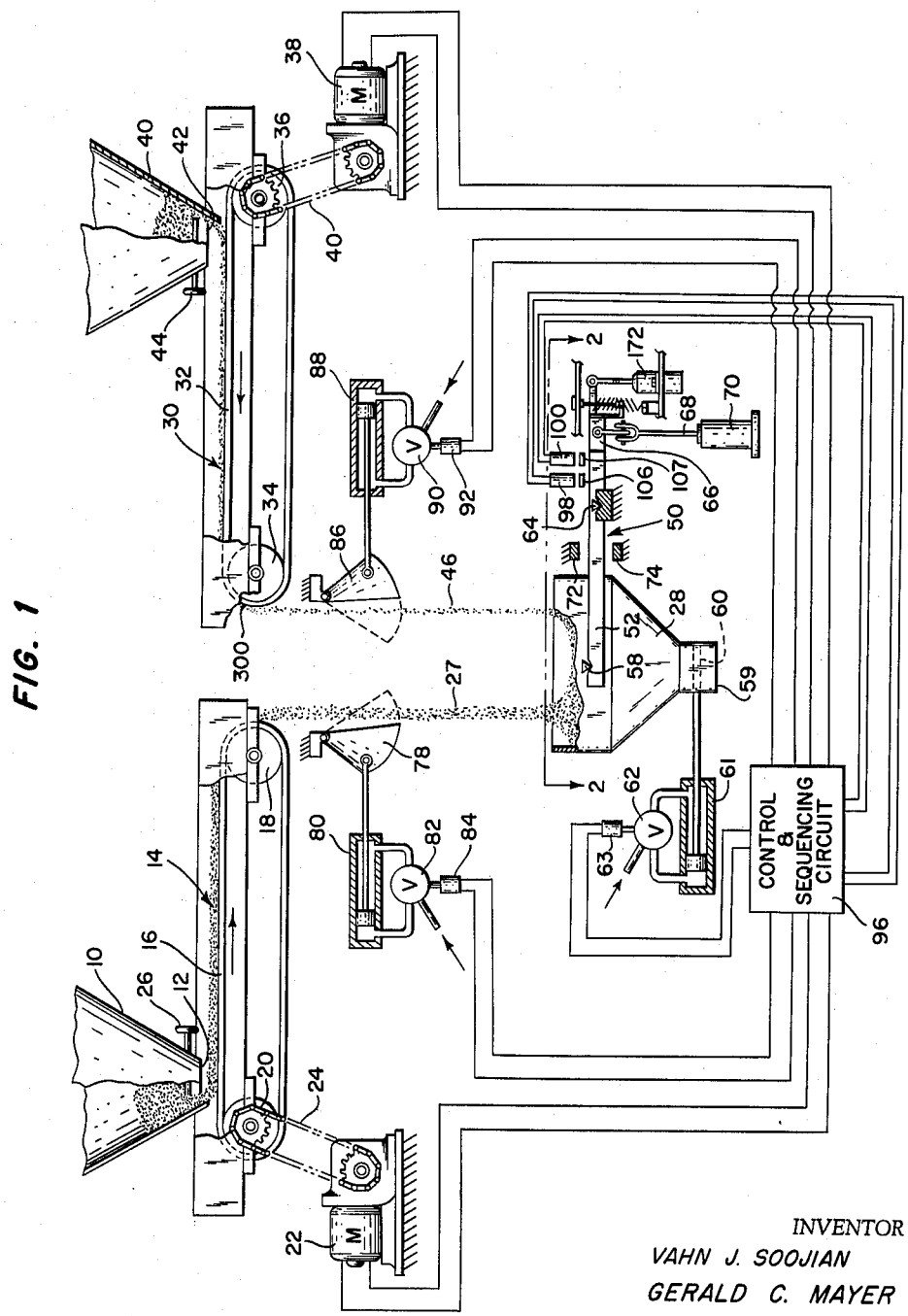
FIGURE 1 is a partially diagrammatic view illustrating an automatic batch weighing apparatus constructed according to a preferred embodiment of the present invention.
Figure 8:
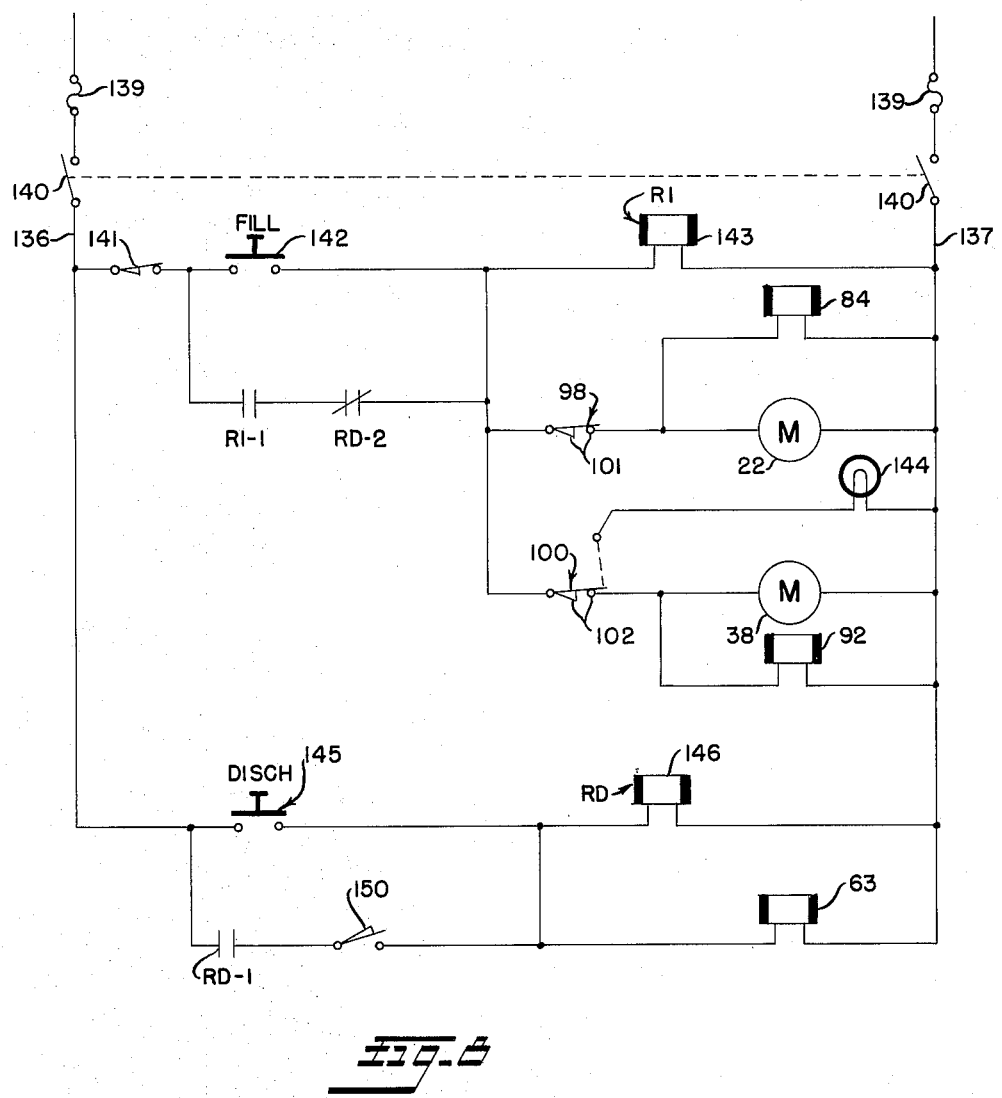

FIGURE 8 diagrammatically illustrates the electrical control and sequencing circuit shown in FIGURE 1; and FIGURE 9 is a graph comprising a plot of the force on the weigh hopper v. time for a cycling and including beam motion curves for the present invention and a comparable prior art weighing apparatus.

In its preferred embodiment, the invention will be described as employed in an automatic batch weighing apparatus having separate motor driven material feeding mechanisms for full flow and dribble flow. It will be appreciated, however, that the invention is applicable to weighing apparatus having no dribble feed as well as apparatus employing a gravity feed.

Referring now to the drawings and more particularly to FIGURE 1, the automatic batch weighing apparatus of this invention comprises a main hopper 10 having an open bottom 12 for discharging fluent or particulate material in a layer upon an endless belt, power driven feeder 14 of conventional construction. Feeder 14 has an upper belt flight 16 which is horizontal and which moves from left to right in FIGURE 1 between pulleys 18 and 20. An electric motor drive 22 connected to pulley 20 by an endless chain 24 drives pulleys 18 and 20 at the same constant speed. A discharge gate 26 is provided to control delivery of material from hopper 10 to feeder 14.

The material passing through the open bottom 12 of hopper 10 is advanced in a layer on the upper belt flight 16 of feeder 14. This material falls off the end of the flight as it passes around pulley 18 and descends in a freely falling continuous column 27 directly into a weigh hopper 28. In this embodiment, feeder 14 is employed to deliver material to hopper 28 at a full flow rate and a separate feeder 30 is used to deliver a dribble feed to the weigh hopper.

Feeder 30 preferably is of the same construction as feeder 14 and has a conveyor belt comprising an upper flight 32 which moves horizontally from right to left in FIGURE 1 between two pulleys 34 and 36. Pulleys 34 and 36 are driven at the same constant speed by an electric motor drive 38 which is connected to pulley 36 by an endless chain drive 40.

A fixed hopper 42 having an open bottom 44 positioned over feeder 30 discharges material by gravity onto belt flight 32. Hopper 42 is provided with a conventional cut-off gate 44 for controlling delivery of material to feeder 30.

With continued reference to FIGURE 1, the material discharged by hopper 42 and advanced by belt flight 32 to the end of feeder 30 above weigh hopper 28 falls off belt flight 32 as it passes around pulley 34 and descends in a freely falling column 46 directly into weigh hopper 28. Columns 27 and 46 preferably are spaced apart as shown.

In the construction shown in FIGURE 1, the relative positions of feeders 14 and 30 are only diagrammatically illustrated, and, in practice, feeder 30 may be positioned beside feeder 14 to provide a more compact assembly. In such case, it is clear that hopper 42 may be an extension or part of hopper 10.

Referring now to FIGURES 1 and 2, a free weigh beam 50 supporting hopper 28 comprises a pair of parallel laterally spaced apart arms 52 and 54 rigidly joined together by a crosspiece 56 (FIGURE 2). Weigh hopper 28 is conventionally suspended in cradle fashion between the free ends of arms 52 and 54 by knife edges indicated generally at 58. The bottom of hopper 46 has an opening 59 which is provided with a discharge gate 60 for permitting the discharge of weighed material by gravity. Discharge gate 60 is opened and closed by a suitable fluid motor 61. A valve 62 having an operator 63 controls supply and exhaust of fluid for operating motor 61.

With continued reference to FIGURES 1 and 2, beam 50 is fulcrumed to the right of knife edges 58 by a pair of knife edges 64 and 65 respectively secured to arms 52 and 54. Fixed to crosspiece 56 midway between arms 52 and 54 is a rigid beam member 66. Member 66 is parallel with and extends in the opposite direction from arms 52 and 54 as shown. A rod 68 (FIGURE 1) carrying counterweights 70 to balance out hopper 28 and the material therein is pivotally suspended from the free end of member 66 at a distance spaced to the right of the beam fulcrum to provide suitable leverage.

As shown in FIGURE 1, weigh beam 50 is freely swingable about its fulcrum between upper and lower closely spaced, relatively fixed stops 72 and 74 and occupies a static position between these stops when a predetermined weight in hopper 28 counterbalances weights 70. Preferably, beam 50, hopper 28, and feeders 14 and 30 are mounted in a suitable casing indicated generally at 76 in FIGURE 2.

With continued reference to FIGURE 1, a pivotally mounted full flow catch gate 78 is interposed between feeder 14 and the open top of weigh hopper 28. A suitable fluid motor 80 of conventional form is connected to swing gate 78 about its pivot axis from the position shown in solid lines to the position shown in dotted lines to effectuate immediate interruption of the material flow in column 27. Supply and exhaust of motor operating fluid (such as pressurized air) for operating motor 80 is controlled by a valve 82 having an operator 84.

For controlling delivery of the dribble feed to hopper 28, a pivotally mounted catch gate 86 (FIGURE 1) interposed between feeder 30 and weigh hopper 28 is swingable about its pivot axis from the position shown in solid lines to a position shown in dotted lines to effectuate immediate cutoff of the dribble feed in column 46. Gate 86 is pivotally displaced between its full and dotted line positions by a fluid motor 88 of suitable, conventional form. Motor operating fluid is conveniently supplied from the source supplying motor 80, and supply and exhaust of this operating fluid for operating motor 88 is controlled by a valve 90 having an operator 92.

As shown in FIGURE 1, operation of feed motors 28 and 38 and valves 62, 82 and 90 is controlled by a control and sequencing circuit 96 in response to actuation of a pair of switches 98 and 100. Switches 98 and 100 are of any suitable, conventional magnetically actuatable construction and respectively comprise sets of switch contacts 101 and 102 (FIGURE 8) enclosed in cylindrical casings 103 and 104 (FIGURE 7). In a manner to be described in detail later on, a pair of permanent, axially polarized magnets 106 and 107 (FIGURES 1 and 2) fixed to weight beam 50 respectively actuate switches 98 and 100 at different positions of beam 50.

Figure 5:
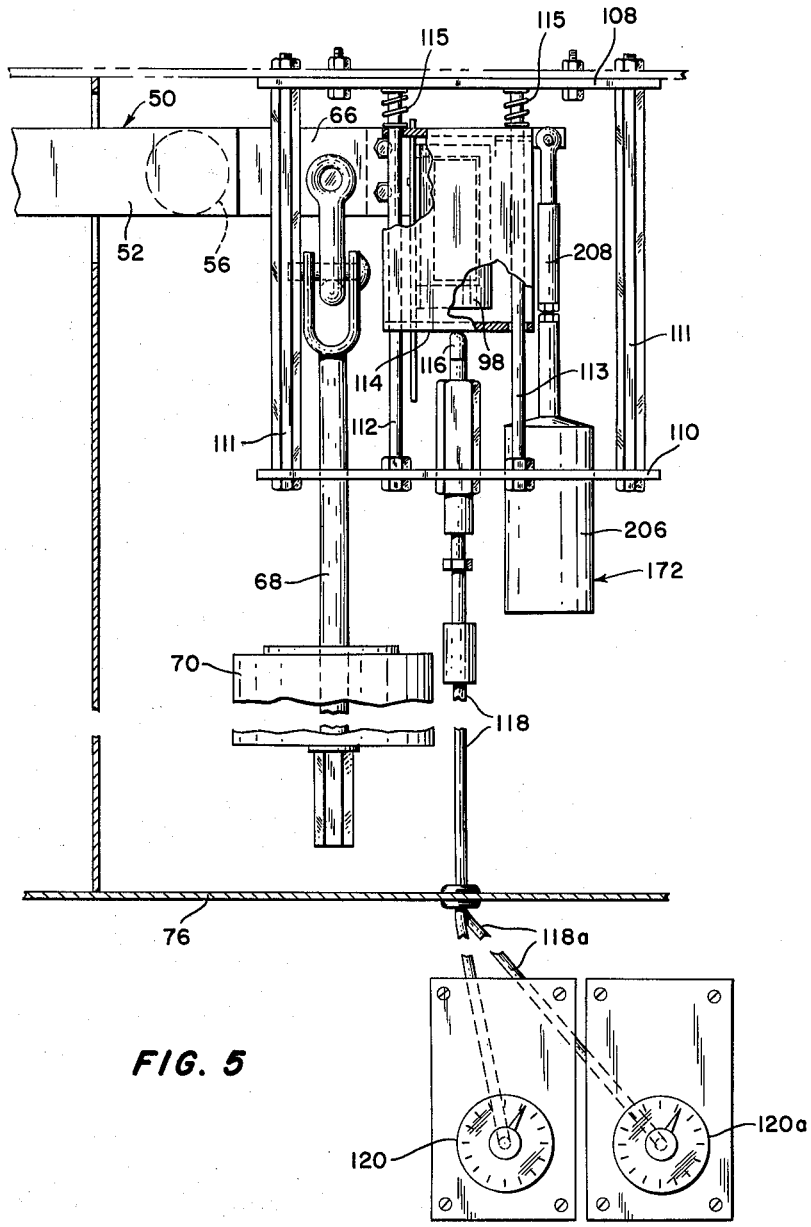
FIGURE 5 is a section taken substantially along lines 5—5 of FIGURE 2.

With continued reference to FIGURES 2, 5 and 7, a mounting assembly for switches 98 and 100 comprises a pair of horizontally arranged upper and lower support plates 108 and 110 which are fixed to casing 76 and which are rigidly secured together in vertically spaced apart relationship by any suitable means such as stay bolt assemblies 111. A pair of upstanding parallel spaced apart guide rods 112 and 113 are fixed at opposite ends to plates 108 and 110. Switch 98 is secured to bracket 114 which is slidably mounted on rods 112 and 113 for vertical displacement in a plane that is laterally spaced from one side of beam member 66.

As best shown in FIGURE 5, bracket 114 is biased by springs 115 into engagement with an axially shiftable drive screw 116 which is threadedly carried by plate 110 and which is connected to a flexible shaft 118. A manual adjustment knob 120 operatively connected to a shaft 118 is manipulatable to vertically displace bracket 114 together with switch 98 to selected position relative to weigh beam 50.

Figure 6:
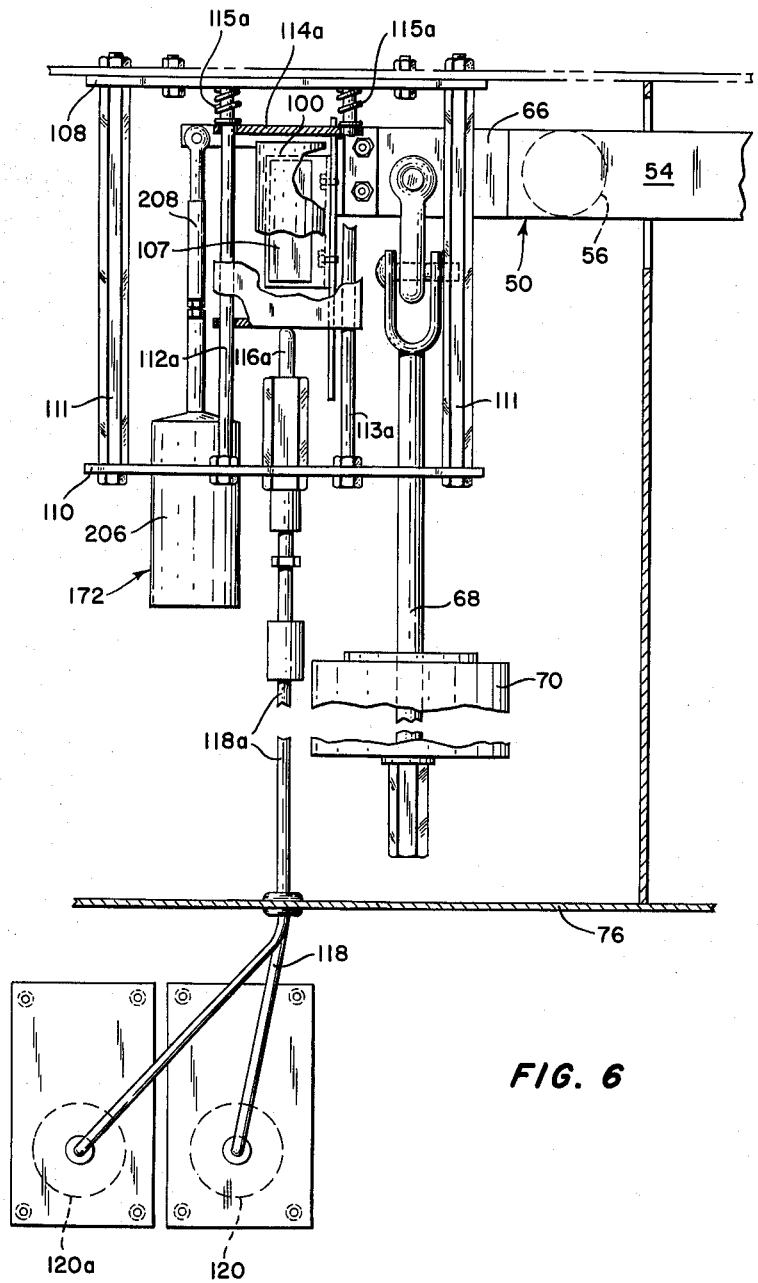
FIGURE 6 is a section taken substantially along lines 6—6 of FIGURE 2.

Referring now to FIGURES 6 and 7, switch 100 is on the side of beam member 66 opposite from switch 98 and is mounted for selective vertical adjustment by a construction which is the same as that previously described for switch 98. Accordingly, like reference numerals suffixed by the letter "a" have been employed to identify like parts.

As best shown in FIGURE 7, magnets 106 and 107 respectively facing switches 98 and 100 are each fixed to a mounting plate 128 by brackets 130 and 132. Plate 128 is fixed to the free end of beam member 66 by any suitable means.

With the foregoing switch and magnet structure, it is clear that magnets 106 and 107 move as a unit with weigh beam 50 into and out of the vicinity of switches 98 and 100 respectively. Thus, as beam 50 swings upwardly from a rest position on lower stop 74, magnet 106 first passes into the vicinity of and actuates switch 98 to de-energize feeder motor 22 and to swing catch gate 78 to its dotted line position in FIGURE 1 for interrupting the full flow feed. Following the cutoff of full flow feed, magnet 107 moves into the vicinity of and actuates switch 100 to stop feeder 30 and swing catch gate 86 to its feed cutoff position for completing the feeding cycle. This operation of switches 98 and 100 will be described in greater detail later on.

Referring now to FIGURE 8, circuit 96 is shown in standby, de-energized condition and comprises a pair of conductors 136 and 137 between which a source of power is connected. Current in conductors 136 and 137 flows through fuses 139 and a suitable power switch 140.

As shown in FIGURE 8, a discharge gate limit switch 141, a spring-loaded, push-button start switch 142, and a winding 143 of a run relay R1 are connected in series circuit relationship across conductors 136 and 137. Limit switch 141 is actuated by discharge door 60 and is closed and opened when door 60 is respectively closed and opened.

To start the feed cycle, switch 142 is depressed and relay R1 will be energized if limit switch 141 is closed, indicating that discharge door 60 is closed. Energization of relay R1 closes contacts R1-1. Closing of contacts R1-1 establishes a holding circuit around switch 142 and maintains continuity in the network to energize motors 22 and 38 and valve operators 84 and 92 after switch 142 is released. Valve operators 84, 92 and 63 in circuit 96 are of any suitable solenoid type.

With continued reference to FIGURE 8, operator 84 and motor 22 are connected in parallel across conductors 136 and 137 and in series with contacts R1-1 and switch 98. Thus, when switch 142 is momentarily closed, a circuit for energizing motor 22 and operator 84 is established through contacts R1-1, a set of closed contacts RD-1, and switch 98 which is closed when beam 50 is in its rest position on stop 74.

Similarly, motor 38 and operator 92 are connected in parallel across conductors 136 and 137 and are in series circuit relationship with contacts R1-1 and switch 100. With beam 50 in its unbalanced static position on lower stop 74, switch 100 is closed. As a result, motor 38 and operator 92 will be energized simultaneously with motor 22 and operator 84 by a circuit traced through contacts R1-1 and RD-2 and switch 100.

Energization of operators 84 and 92 position their respective valves 82 and 90 to admit pressurized motor operating fluid to motors 80 and 88 for swinging catch gates 78 and 86 to their full line positions in FIGURE 1. With feeders 14 and 30 in operation, material will now be delivered to weigh hopper 28.

As hopper 28 fills with material, beam 50 responds by swinging upwardly toward its balanced position shown in FIGURE 1. When the weight of material in hopper 28 approaches the desired predetermined weight, beam 50 reaches a position where magnet 106 opens switch 98. This de-energizes motor 22 and operator 84 to interrupt delivery of material from feeder 14. However, motor 38 and operator 92 remain energized to continue the dribble feed in column 46.

When beam 50 approaches its balanced position, magnet 107 opens switch 100, thereby de-energizing motor 38 and operator 92 to stop feeder 30 and to swing catch gate 86 to its dotted line position in FIGURE 1 where it interrupts the delivery of material descending in dribble column 46. Opening of switch 100 completes a circuit for illuminating a pilot lamp 144, indicating that the feeding cycle has been completed.

To discharge the draft of material in hopper 28, a spring-loaded, push-button discharge switch 145, shown in FIGURE 8, is momentarily depressed to establish a circuit for energizing a winding 146 of a relay RD. Winding 146 is connected across conductors 136 and 137 in series with switch 145.

Energization of relay RD opens a set of contacts RD-2 and closes contacts RD-2. Opening of contacts RD-1 prevents energization of operators 84 and 92 and feeder motors 22 and 38 while material is being discharged from hopper 28. By closing contacts RD-1, a holding circuit is established around switch 145 to energize operator 63.

Energization of operator 63 positions valve 62 to admit pressurized operating fluid to motor 61 for opening discharge door 60 and thereby permitting the draft of material in hopper 28 to be discharged.

In series with operator 63 and contacts R1-1 is a discharge gate limit switch 150 which is opened by opening door 60 to a predetermined position. As a result, operator 63 will be de-energized to position valve 62 for closing door 60. Preferably, switch 150 has a delayed action to assure that the entire draft in hopper 28 is discharged before interrupting the energizing circuit to operator 63. By opening switch 150, relay RD is de-energized to close contacts RD-2 and thus condition the circuit for another feeding cycle.

Switches 98 and 100 are adjusted to positions where the weight of the draft fed to hopper 28 at the end of the feeding cycle substantially equals the desired weight which is predetermined by weights 70 on beam 50.

In accordance with the present invention, the motion of weigh beam 50, as best shown in FIGURES 3 and 4, is controlled by a pair of spring assemblies 168 and 170 and a dash pot 172. These components 168, 170 and 172, as will presently become apparent, cooperate to establish a constant beam lag and to render the motion of beam 50 closely proportional to the load applied to weigh hopper 28.

As best shown in FIGURES 3 and 4, spring assembly 168 comprises a helical coil tension spring 174 having a lower end 176 hooked around a bolt 180 and securely clamped in place between washers 182 and 184 by a nut 186 and a tubular spacer 188. Bolt 180 extends through plate 128 and spacer 188 which is confined between washer 182 and plate 128. Nut 186 is threaded on the end of bolt 180 and is tightened against washer 184 to draw the head of bolt 180 firmly against plate 128 and to clamp spacer 188, washers 182 and 184, and spring end 176 in place. As a result, the lower end of spring 174 is securely fixed to beam 50.

With continued reference to FIGURES 3 and 4, the upper end of spring 174 surrounds and is securely seated on a collar 192 which receives a threaded rod 194. Rod 194 extends vertically upwardly in axial alignment with spring 174 and passes through plate 108. Locking nuts 196 and 198 on opposite sides of plate 108 are threaded on rod 194 to fix rod 194 to plate 108. Collar 192 is fixed in place on rod 194 by adjustment nuts 200 and 202. Nuts 200 and 202, as shown, are on opposite sides of collar 192 and may be loosened to permit selective adjustment in the tension of spring 174.

With continued reference to FIGURES 3 and 4, spring assembly 170 is of the same construction as assembly 168. Acordingly, like reference numerals suffixed by the letter "a" have been used to identify corresponding parts in assembly 170.

As shown, assembly 170 is turned 180° with respect to assembly 118 so that the lower end of rod 194a is secured to plate 110, and the upper end of spring 174a is secured to plate 128. Spring assemblies 168 and 170 extend along parallel axes and are laterally spaced on opposite sides of beam member 66. Springs 174 and 174a are adjusted in tension to continuously exert equal but opposite forces on weigh beam 50 in its static balanced position. The axes of assemblies 168 and 170 preferably are normal to the fulcrum axis of beam 50.

With continued reference to FIGURES 3 and 4, dash pot 172 is of suitable, conventional construction and comprises a casing 206 fixed to plate 110 and receiving a piston (not shown) which moves up and down in a fluid bath. A piston rod 208 connected to the piston in casing 206 extends upwardly and is pivotally secured by a nut and bolt assembly 209 to an arm 210 which is rigidly fixed to plate 128 between spring assemblies 168 and 170. Dash pot 172 thus exerts a dampening force on weigh beam 50 which is parallel to the forces exerted by springs 174 and 174a and in the same direction as the force exerted by weight 70.

Referring now to FIGURE 9, a curve 220 represents the motion of weigh beam 50 in the weighing apparatus of the present invention. This curve is compared with a curve 222 and a curve 224 respectively representing the load applied to weigh hopper 28 and the beam motion of a typical prior art weighing apparatus in which the present invention is omitted.

With continued reference to FIGURE 9, it is seen that between zero time when delivery of material in the feeding cycle is initiated and time A, the material descending in columns 27 and 46 have not reached hopper 28 with the result that no load is applied to hopper 28. At time A, columns 27 and 46 contact hopper 28 and the resulting impact causes curve 222 to rise abruptly. Thereafter, as material accumulates in hopper 28 at a constant feed rate, curve 222 has a straight line section 226 of substantially constant slope between time A and time B. Curve section 226 represents the impact forces of the descending columns and the weight of material accumulating in hopper 28. At time C, which precedes time B, switch 98 is actuated to cut off full flow, but because of the unavoidable lag in controls previously mentioned, material will continue to accumulate at a constant rate in hopper 28 until time B.

At time B, column 27 collapses, and the impact force ceases, causing a sharp drop in curve 222 and leaving only the load applied by the dribble feed in column 46. From this dribble feed, material accumulates at a lesser rate. Assuming this rate to be substantially constant for a single feed cycle, curve 222 will have a straight line section 236 terminating at time D. At time E, which precedes time D, cutoff switch 100 is actuated, but owing to the previously mentioned lags in the system, dribble flow will continue until time D. At this time, the last particles in the now collapsing column 46 contact the material in hopper 28 and the impact force abruptly ceases with the result that curve 222 falls sharply to a value equivalent to the balanced weight of material in hopper 28.

With continued reference to FIGURE 8, a curve 228 representing the accumulation of material in hopper 28 comprises two straight line sections of different slopes, thus reflecting the difference between feed rates at full flow and dribble flow.

From curve 224, it is seen that the beam of the prior art weighing apparatus does not respond immediately to the impact of material in the weigh hopper. Rather, there is an appreciable time delay before the weigh beam begins to move with the result that the time lag between curve 224 and curve 222 is considerable. After the beam has started its motion, curve 224 indicates the following: (1) the time lag between curves 224 and 222 is not constant for a given feed rate and also varies as the feed rate changes; (2) the system may be in a transient or variable velocity condition at the full flow and final cutoff points with the result that the response time has more chance to vary to adversely affect the accuracy of the scale; and (3) an objectionably long time is required for the beam of curve 224 to stabilize at dribble position before the scale proceeds to final cutoff. With this beam motion indicated by curve 224, the feed cycle will be relatively slow so that, at best, only eight or nine weighings can be made per minute.

With the present invention, however, these objectionable conditions are overcome and it is possible to obtain eighteen to twenty weighings per minute without sacrifice of accuracy. This increased speed is made evident by a comparison of beam motion curves 220 and 224. As shown by curve 220, the motion of weigh beam 50 in this invention is so controlled by spring assemblies 168 and 170 and dash pot 172 that it responds immediately to the initial impact and accumulation of material in weigh hopper 28.

After a brief acceleration period following time A, beam 50 quickly attains a constant velocity state represented by the straight line section 230 of curve 220. This constant velocity state occurs well before time C at which the full flow cutoff switch 98 is actuated and continues until a short time after time B. During this time, curve section 230 has the same slope as section 226 of load curve 222 and thus lags section 226 by a constant magnitude $T_L$. From this it is clear that the actual instantaneous position of weigh beam 50 during its steady velocity state closely lags an instantaneous load balancing position by a constant magnitude. In changing from the full flow feed rate to the dribble feed rate, it will now be seen that this constant lag does not vary, but rather remains the same.

Following the interruption of material delivered by feeder 14, curve 220 reaches a peak shortly after time B, falls sharply at 232 in response to this load reduction, and then resumes a steady state condition represented by the straight line section 234. Following the final cutoff, beam 50 quickly reaches a static balancing position very shortly after time D. The slope of section 234 during the dribble feed stage is the same as the straight line section 236 of load curve 220 and lags section 236 by a constant magnitude which is equal to the magnitude $T_L$ by which curve section 230 lagged section 226.

Even where the full flow or dribble feed rate changes, it has been found in this invention that, as a result of the beam motion control achieved with spring assemblies 168 and 170 and dash pot 172, the magnitude of lag $T_L$ will not change and will remain constant. If, for example, the dribble feed rate changes for some reason, the steady velocity of beam 50 will proportionately change, but lag $T_L$ will remain the same. Accordingly, the lag between the actual instantaneous beam position and its instantaneous load balancing position is independent of feed rate and is constant except for the brief transient periods occurring shortly after times A and B. As a result, no adjustments are needed in the weighing apparatus of this invention to compensate for changes in feed rate.

In controlling the motion of weigh beam 50, the separate functions of spring assemblies 168 and 170 and dash pot 172 will now be considered. Without dash pot 172, spring assemblies 168 and 170 render the motion of beam 50 closely proportional to load curve sections 226 and 236, but will cause beam 50 to oscillate about sections 226 and 236. These oscillations are essentially attributable to the inertia of beam 50 which tends to cause it to continue past its balancing position once it has started to move. This action will cause spring 74 to compress, absorbing energy, and then expand, releasing the stored energy to swing beam 50 in a direction which compresses spring 174a. Thus, without dash pot 172, beam 50 would oscillate owing to the alternate compression and expansion of springs 174 and 174a.

Dash pot 172 in cooperating with springs 174 and 174a is adjusted to absorb this inertial energy tending to cause beam 50 to move past its static balancing position with the result that the previously mentioned oscillations are damped out and the constant beam lag is established. Accordingly, the magnitude of lag $T_L$ will be a function of the dash pot action and the mass of the moving scale parts.

With continued reference to FIGURE 9, it is evident from curve 220 that weigh beam 50 of this invention passes quickly through its transient stages immediately following times A and B and attains full flow and dribble flow steady state conditions well before the cutoff times C and E. As a result, the motion of beam 50 at these cutoff times is very stable and predictable, permitting accurate adjustment of switches 98 and 100.

A critical part of the previously described feeding cycle is between times B and D where the full flow column 27 collapses and beam 50 passes through its transient stage before resuming a stabilized condition in which lag $T_L$ is constant. In the present invention, this transient condition represented by curve portion 232 is very short and well ahead of the final cutoff at time E with the result that accuracy of the weighing apparatus is not subject to being upset. In comparison, the corresponding transient condition in prior systems as represented by curve 224 is much longer so that the weigh beam may still be in this condition at the time of final cutoff. This may result in a premature cutoff of the feed to impair the accuracy of the apparatus.

With the shortened transient period obtained by the present invention, these problems are minimized and the final cutoff can be made at an earlier time to reduce the time needed for each feeding cycle.

With the present invention, the constant lag $T_L$ permits the catch gate 86, which effects the final cut off of material delivery to hopper 28, to be critically located to effectively eliminate the need to compensate for material in suspension at the time cutoff switch 100 is actuated. To this end, the beam lag time, $tb$, being constant, can be determined. Similarly, the reaction time, $tg$, needed for gate 86 to effect a cutoff for feed to hopper 28 after switch 100 is tripped is fundamentally a machine constant and, consequently, can also be determined. The total lag time, $tb+tg$, will therefore be constant. The fixed distance D traveled by a particle of material in time $tb+tg$ from a point 300 (FIGURE 1) having zero vertical velocity in column 46 can then be determined from the equation:

$$D = \tfrac{1}{2} g (tb + tg)^2$$

By locating gate 86 so that it will interrupt the feed at distance D below zero velocity, it will effectively prevent material in transit for time $tb+tg$ from reaching hopper 28. As a result, the beam position at static balance will be the same at which gate action is initiated. Thus, no compensation is required for material in suspension at the time final cutoff is made. It will be appreciated that gate 86 can be critically located in this manner only since the beam lag, $tb$, is constant.

If gate 86 is located above or below this critical position, lighter and heavier weighings will respectively be produced. For such positions not coinciding with the critical position, switch 100 must be adjusted to effectively compensate for resulting difference to assure that the actual weight of the draft closely conforms with the desired predetermined weight.

With gate 86 in its critical position, only the inherent inconsistencies of the scale require compensative adjustment. The consistency of the scale is essentially a measure of its inability to deliver exactly the same weight in every draft. As a result, it is fundamentally a machine constant and is easily compensated for by adjustment of switches 98 and 100. Thereafter, no further compensative adjustments are normally needed with the weighing apparatus of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come wthin the meaning and range of equivalency of the claims are therefore intended to be embraced therein.

What is claimed and desired to be secured by United States Letters Patent is:

1. A weighing apparatus comprising a weigh hopper, means for feeding material to said hopper in a continuous falling column, a counterweighted fulcrumed weigh beam operably connected to said hopper, means interposed between said feeding means and hopper and being actuatable to cut off the feed of material to said hopper, means responsive to movement of said beam to a predetermined position to actuate said cutoff means, said beam being swingable from a rest position to a static balanced position in response to feeding of material to said hopper, first means operably connected to exert opposite force moments on said beam which are substantially equal in the static balanced position of said beam and second means connected to said beam, said second means cooperating with said first means to so control the motion of said beam that its actual instantaneous position between said rest and static balanced positions lags an instantaneous balancing position by a substantially constant time.

2. The weighing apparatus defined in claim 1 wherein said feeding means delivers material from a point above said hopper and wherein said cutoff means is actuated in response to said beam movement with a predetermined time lag relative to beam positioning for intercepting delivery of material in said falling column, said cutoff means being disposed to intercept said column at a distance below said point equal to the distance of fall of said material during a time proportional to the sum of said predetermined time lag and the time lag of said beam.

3. An automatic weighing apparatus comprising a weigh hopper, means for feeding material to said hopper in a continuous falling column, a counterweighted fulcrumed weigh beam operably connected to said hopper, means interposed between said feeding means and hopper and being actuatable to cut off the feed of material to said hopper, means responsive to movement of said beam to a predetermined position to actuate said cutoff means, said beam being swingable from the rest position to a static balanced position in response to feeding of material to said hopper, spring means operably connected to exert opposite force moments on said beam which are substantially equal in the static balanced position of said beam and a dampening device connected to said beam, said dampening device cooperating with said spring means to so control the motion of said beam that its actual instantaneous position between said rest and static balanced positions lags an instantaneous balancing position by a substantially constant time.

4. The weighing apparatus defined in claim 3 wherein said spring means comprises a pair of oppositely acting springs both connected to said beam to one side of the beam fulcrum.

5. The automatic weighing apparatus defined in claim 3 wherein said spring means comprises a pair of springs each having a stationary end and an end connected to said beam said springs being so arranged as to exert said opposite force moments on said beam.

6. The weighing apparatus defined in claim 5 wherein each of said springs comprises a helically coiled tension spring and wherein means are provided for selectively adjusting the tension in each of said springs.

7. The automatic weighing apparatus defined in claim 3 wherein said dampening device comprises a dash pot.

8. An automatic weighing apparatus comprising a weigh hopper, means for feeding material to said hopper in a continuous falling column, a fulcrumed weigh beam supporting said hopper and being counterweighted to balance a predetermined weight of material fed to said hopper, a catch gate interposed between said feeding means and hopper and being actuatable to cut off the feed of material to said hopper, means responsive to movement of said beam to a predetermined position to actuate said gate, said beam being swingable from a rest position to a static balanced position in response to feeding of material to said hopper, spring means operably connected to exert opposite force moments on said beam which are substantially equal in the static balanced position of said beam, and a dampening device connected to said beam to exert a force directed to counterbalance said hopper, said dampening device cooperating with said spring means to so control the motion of said beam that its actual instantaneous position between said rest and static balanced positions lags an instantaneous balancing position by a magnitude that is independent of the material feed rate to said hopper and substantially constant.

9. The automatic weighing apparatus defined in claim 8 wherein the response of said gate to feed cut-off action is delayed by a substantially constant time, and wherein means are provided for supporting said catch gate at a position below zero vertical velocity of said column where it is effective to prevent only that material which is in transit for the time corresponding to the constant beam lag and the delayed response of said catch gate from reaching said hopper when delivery of material thereto is interrupted.

10. The automatic weighing apparatus defined in claim 8 wherein said means responsive to beam movement comprises first and second parts, said first part being mounted for unitary movement with said beam, and said second part being fixed against movement, one of said parts comprising a magnet, and the other of said parts comprising a magnetically actuated switch cooperating with said magnet when in the vicinity thereof to generate a signal for actuating said gate.

References Cited by the Examiner

UNITED STATES PATENTS

| 1,018,173 | 2/1921 | Dunn | 177—194 |
| 1,702,741 | 2/1929 | Mojonnier | 177—195 |
| 1,861,147 | 5/1932 | Steimel | 177—120 |
| 1,911,235 | 5/1933 | Morrow | 177—63 |
| 2,111,921 | 3/1938 | Bleam | 177—71 |
| 2,497,015 | 2/1950 | Richardson | 177—63 |
| 2,597,831 | 5/1952 | Willis | 177—108 |
| 2,886,302 | 5/1959 | Coffman et al. | |
| 2,919,099 | 12/1959 | Pelz | 177—71 |
| 3,117,639 | 1/1964 | Dreeben | 177—63 |

LEO SMILOW, *Primary Examiner.*

LEYLAND M. MARTIN, *Examiner.*